Nov. 7, 1950  E. F. PITRE  2,529,417
DISK AND VANED ROTARY HOE
Filed March 17, 1947
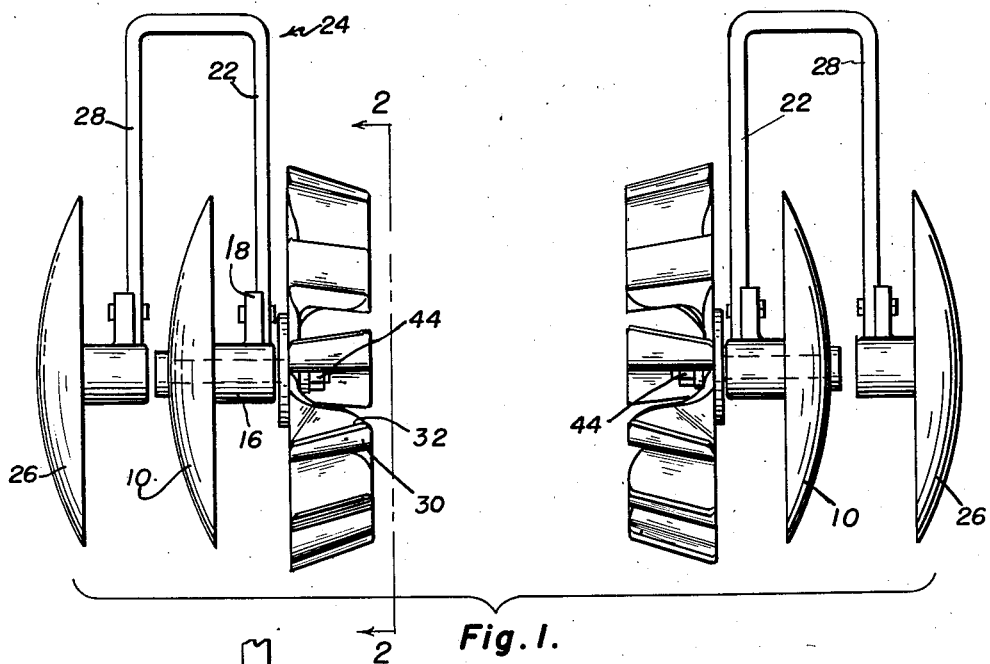
Fig. 1.
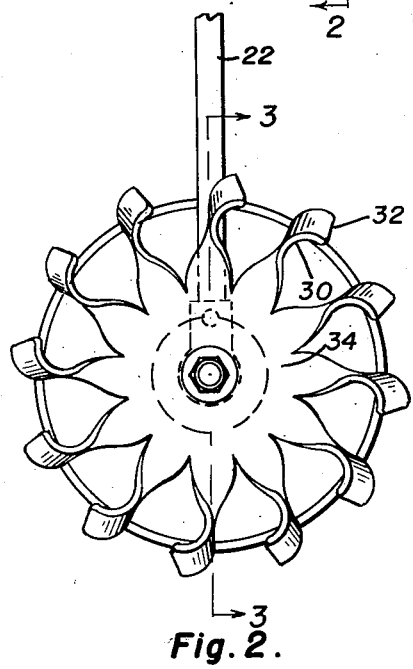
Fig. 2.
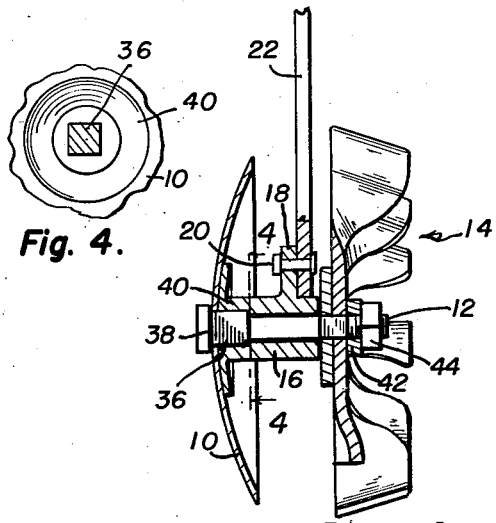
Fig. 3.
Fig. 4.
Inventor
Ernest F. Pitre
By Clarence A. O'Brien
and Harvey B. Jacobson
Attorneys Patented Nov. 7, 1950

2,529,417

UNITED STATES PATENT OFFICE 2,529,417

DISK AND VANED ROTARY HOE

Ernest F. Pitre, New Iberia, La.

Application March 17, 1947, Serial No. 735,122

2 Claims. (Cl. 97—212)

This invention relates generally to cultivators, and more particularly to a device designed for the attachment to an agricultural implement such as the cultivator described in the applicant's co-pending application, entitled Sugar Cane Stubble Digger, filed in the U. S. Patent Office on December 16, 1946, Serial No. 716,572, or any similar implement, the essential features of the device including a concavo-convex disc and a specially designed vaned rotary hoe rigidly secured on a common shaft, and the purpose of the device being principally to loosen the earth and destroy weeds, including grass, the particular use of the device, when attached to the above mentioned sugar cane stubble digger, including the removal of a portion of the earth so as to permit growth of the sugar cane, the action of the device being in all cases essentially that of a hoe.

The primary purpose of this invention is, therefore, to provide a rotary hoe which may be used to provide for cultivation of a character very similar to the type of cultivation ordinarily associated with the use of a hand hoe, and to accomplish this hoeing action more expeditiously than is possible by the use of hand hoes.

It is another object of this invention to provide a rotary hoe with a concavo-convex disc, spaced therefrom and adapted to rotate therewith, the combined elements being designed to rotate at a faster rate than the ordinary disc harrow, since the vanes of the hoe prevent slippage. This prevention of slippage of the disc as the implement is drawn forward is reflected in a more extensive cultivation of the earth by this disc, a desirable depth of soil penetration being accomplished without undue tilting of the discs, that is, adjustment of the discs so that the discs rotate about an axis not normal to the direction of movement of the implement. In this connection, it should be noted that the effect of the vaned hoe in accelerating the rotation of the disc is heightened by reason of the relatively wide blades of the hoe, and the fact that this hoe is greater in diameter than the corresponding disc.

Another object of this invention is to provide an improved rotary hoe which is adapted to be supported angularly to the direction in which the implement is being drawn, and to provide the individual vanes of this rotary hoe with ground-contacting sharpened edges which are disposed normally to the direction in which the implement is being drawn, this allows for maximum penetration and cultivation of the soil with minimum tractive power.

And a still further object of this invention is to provide the above mentioned vanes in a novel twisted or spiral form, the rotary hoe being preferably constructed so that the hub portion is a flat plate with the individual vanes extending outwardly from one face of this plate, this construction having been found to greatly lessen the tendency of the rotary hoe to become clogged with vegetation such as grass roots and prevents the rotary hoe from becoming matted with damp clay.

And a last object to be specifically mentioned is to provide a device of this character which is relatively inexpensive and practicable to manufacture, simple and convenient to install, adjust and use, and which will give generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Figure 1 is a grouped view of two of the units designed according to this invention, the figure being side elevational in character, and the units being disposed on the sheet in the positions occupied when secured to an implement such as a sugar cane stubble digger, except that in actual practice these units will be tilted so that the shafts are depressed at the ends whereon the discs are secured, and except that each unit will be rotated so that the discs are disposed rearwardly of the vaned hoes;

Figure 2 is another side elevational view of the improved device;

Figure 3 is a vertical sectional view, taken on the line 3—3 in Figure 2; and,

Figure 4 is a fragmentary detail view, adapted to show how the disc is retained on the end of the shaft, the figure being taken on the line 4—4 in Figure 3 and being largely in elevation.

Similar characters of reference designate similar or identical parts and portions throughout the specification and throughout the several views of the drawings.

Referring now to this drawing in detail, it will be noted that a concavo-convex disc 10 is mounted on one end of a shaft 12 of bolt character, and a multi-vaned rotary hoe, generally indicated by the numeral 14, is mounted on the other end of this shaft 12. A bearing 16, provided with an attachment boss 18, is secured as by welding and/or a rivet or bolt 20, to the depending arm 22 of a U-shaped attachment bracket, generally indicated by the numeral 24 and centrally supports the journal portion of the shaft 12. It will be noted that the above described structure is shown combined with a second disc 26, similar to the disc 10, rotatively mounted in any suitable manner on the depending arm 28 of the U-shaped member 24, the provision of this second disc being made to adapt the device for attachment to implements which ordinarily carry a plurality of discs, rather than a single disc, and the provision of this second disc 26 being thought of as not essential to the proper functioning of this device. It will be understood, of course, that the U-shaped member 24 is used to mount the improved device upon the implement, and that the implement will be adapted for propulsion by a tractor or by animals, so that the discs and the rotary hoe 14 may be made to engage the ground as the implement is propelled.

The construction of the multi-vaned hoe 14 will be most easily described by reciting the major steps in the manufacture thereof from a flat disc. A disc is parted along a plurality of radiating lines equi-angularly spaced to divide the disc into a plurality of portions. These portions may be reduced in width, that is, the disc may be notched rather than simply radially parted, when vanes of lesser width are desired. In all cases the individual vanes are twisted to provide curved or spiral surfaces 30 intermediate the ends thereof, and it should be carefully noted that the outer edges of the vanes, that is, the sharpened ground-contacting edges 32, are disposed at an angle other than 90° to the axis of the hoe. This angle corresponds substantially with the angle at which the shaft 12 is disposed with relation to the line drawn normal to the direction in which the implement is to be drawn. It should also be carefully noted that all vanes are made to extend in one direction from one face of the flat hub portion 34, so that what may be referred to as the inner edges of the vanes are co-planar with the inner face of the hub portion 34. It should be noted that this construction provides for ground-contacting edges 32 inclined in two planes to the plane of the hub portion 34, this structure, therefore, differing greatly from the structure of vanes in pumps and the like, and involving a new theory of design.

The means for securing the disc 10 and the rotary hoe 14 to the shaft 12 is illustrated in the drawings as including a squared portion 36 and a head 38 on one end of the shaft 12, the squared portion 36 being adapted for insertion through a square hole in the center of the disc 10 and the head 38 being adapted to hold the disc in tight abutting relation with a mushroom fitting 40 which is also provided with a square axially disposed hole to receive the squared portion 36 of the shaft, the inner end of this mushroom fitting 40 being adapted to bear against the outer face of the bearing 16. The rotary hoe 14 is secured on the other end of the shaft 12 by means of a washer 42 and a nut 44 which is adapted to be screwed onto the suitably threaded end of the shaft 12.

Many useful modifications of the illustrated device may be resorted to, without departure from the spirit and scope of this invention, it being considered practicable to secure the rotary hoe 14 and the disc 10 by means differing from that shown in the drawings.

The method of operation of this device will be clear from the foregoing description of the mechanical details of this invention, taken in connection with the above recitation of the objects sought to be achieved by this invention, but, in recapitulation, it may be noted that the hoe 14 and disc 10 may be used with or without the second disc 26, that the device is mounted so that the shaft 12 is tilted in two directions, that is, in two planes, relative to the line drawn normal to the direction in which the implement is to be drawn, so that the edges 32 of the vanes are disposed normal to this line, the shape of the rotary hoe being adapted for self-cleaning as the device is used, and the disc 10 being forced by the hoe 14 to rotate faster than the discs of an ordinary disc harrow with the above described beneficial results.

Though there has been described a particular embodiment of this invention, this application is not limited to this particular embodiment, but it is desired to include in the scope of this invention the construction, combination and arrangement of parts and portions substantially as set forth in the appended claims.

What is claimed as novel and improved is:

1. A vaned rotary hoe comprised of a unitary plate having a flat hub portion and radially disposed vanes, one edge of each vane being coplanar with the outside surface of said hub portion, ground-contacting edges disposed at an acute angle with the axis of the vaned hoe, spirally curved surfaces intermediate the ends thereof, and the inner ends of the vanes being spaced a distance from the shaft substantially equal to the length of said spirally curved surfaces so that a large space is preserved between the shaft and vanes to prevent clogging of the vaned hoe.

2. Rotary cultivating means adapted for maximum rotation and imparting maximum lateral thrust to the cultivated ground, comprising a concavo-convex disc, a vaned rotary hoe of a diameter greater than said disc, a shaft upon which both disc and hoe are rigidly fixed, and means to mount said shaft for free rotation on the frame of an agricultural implement, said hoe being comprised of a unitary plate having a flat hub portion and radially disposed vanes, one edge of each vane being coplanar with the outside surface of said hub portion, the concave side of said disc being disposed toward the flat hub portion and the coplanar edges of the vanes, and said means including a bearing for said shaft between said disc and hoe, a boss on said bearing, a depending arm secured to said boss, whereby clogging of the space adjacent said arm and between the hoe and disc is prevented, said vanes having ground-contacting edges disposed at an acute angle with the axis of the vaned hoe, said vanes having spirally curved surfaces intermediate the ends thereof, and the inner ends of the vanes being spaced a distance from the shaft substantially equal to the length of the spirally curved surfaces so that a large space is preserved between the shaft and vanes to prevent clogging of the vaned hoe.

ERNEST F. PITRE.

REFERENCES CITED

The following references are of record in the file of this patent:

UNITED STATES PATENTS

| Number | Name | Date |
|---|---|---|
| 371,594 | Kirk | Oct. 18, 1887 |
| 1,111,967 | Meeker | Sept. 29, 1914 |
| 2,389,976 | Hebert | Nov. 27, 1945 |

FOREIGN PATENTS

| Number | Country | Date |
|---|---|---|
| 29,738 | Denmark | June 12, 1922 |